United States Patent Office 3,784,539
Patented Jan. 8, 1974

3,784,539
PROCESS FOR THE POLYMERIZATION
OF OLEFINS
Morris R. Ort, Seabrook, Tex., assignor to
Monsanto Company, St. Louis, Mo.
No Drawing. Filed Sept. 7, 1971, Ser. No. 178,431
Int. Cl. B01j 11/84; C08f 1/56, 3/06
U.S. Cl. 260—94.9 C
11 Claims

ABSTRACT OF THE DISCLOSURE

Olefins are polymerized in the presence of hydrogen as a molecular weight control agent with a Ziegler-type catalyst composition comprising a mixture of a compound of vanadium and a reducing agent which is an organoaluminum compound and an alkylaluminum alkoxide, said composition being prepared by combining said components in such order that said aluminum alkoxide is present prior to combination of said vanadium compound with said organoaluminum compound. The catalyst so prepared enhances the ability of hydrogen to act as a chain-transfer agent in controlling molecular weight, that is, lower molecular weight polymers can be produced at a given hydrogen concentration or lesser amounts of hydrogen are required to produce polymer products having specified molecular weights.

BACKGROUND OF THE INVENTION

The present invention relates to an improved process for the polymerization of olefins such as ethylene and, more particularly, to an improved catalytic system providing for control of the polymerization of olefins so as to produce polymers with particularly desirable physical properties in good yields.

It has been well known for some time now that ethylene and other olefins can be polymerized alone to produce homopolymers or in combinations to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal in combination with various reducible heavy metal compounds such as the halides, alkoxides, acetylacetonates, etc., of the metals of Groups IV–B, V–B, VI–B, VII–B and VIII of the Periodic System. Among the preferred types of catalyst for this reaction are those consisting of a vanadium compound and an organo-aluminum compound such as an aluminum alkyl or an alkyl aluminum halide as an activator. Particularly preferred are catalysts containing vanadium oxychloride with an alkyl aluminum compound such as triethylaluminum, ethylaluminum dichloride, diethylaluminum chloride and the like. With these catalysts, very small amounts of the vanadium compound are employed to provide high yields of polymer per unit of catalyst which can be processed without further purification or chemical treating after recovery from the reaction mixture by simple separation techniques such as filtration, centrifuging, evaporation or purging.

Generally, the polymers produced with the foregoing catalysts are of high density, that is, 0.95 and above. The molecular weight of the polymers so produced fall within a wide range. Polymers having molecular weights from 2,000 to 300,000 and as high as 3,000,000 or more can be produced. Control of molecular weight can be effected to some extent by controlling process variables but in view of the general interdependence of process variables such control is usually effected by addition of various amounts of modifying agents such as hydrogen as described, for example, in U.S. 3,051,690. When hydrogen is employed, however, in the large quantities which are sometimes required to obtain the desired molecular-weight control, say in amounts in excess of 50% by volume, the polymerization reaction rate drops off, resulting in a decrease in productivity per unit time. Moreover, only a certain degree of control can be effected with hydrogen when employing the described catalyst systems, there being an upper limit, depending upon the particular catalyst system, beyond which any further addition of hydrogen has little additional effect.

In a copending application of even date herewith, a means of overcoming the drawbacks or disadvantages discussed above with a titanium-containing catalyst complex has been described and claimed. It has now been discovered that the addition of a small amount of an alkylaluminum alkoxide to the catalyst complex as has been described in that application will likewise result in modification of a vanadium-containing catalyst complex so as to result in a catalyst composition with increased sensitivity to hydrogen. However, contrary to the case with titanium-containing catalysts, to obtain any significant effect with the vanadium-containing catalyst, the alkoxide must be added to the other catalyst components in a particular manner, i.e., it must be present before the vanadium compound and the organoaluminum reducing agent are combined.

SUMMARY OF THE INVENTION

In accord with the present invention, an alkylaluminum alkoxide is added to a catalyst complex employed for the polymerization of olefins comprised of a mixture of a compound of vanadium and a reducing agent which is an organoaluminum compound of the formula $R_nAlX_{3-n}$ wherein R is selected from the group consisting of saturated acyclic hydrocarbon radicals, saturated cyclic hydrocarbon radicals and aromatic radicals, each R containing from 1 to 10 carbon atoms, X is a halogen atom and $n$ is 1, 2 or 3, or mixtures of such compounds. The alkoxide mut be added prior to the reaction of the two major constituents of the catalyst if its beneficial effect is to be obtained to any practical degree. Preferably, for optimum results, the alkylaluminum alkoxide and the vanadium compound are reacted together and then added to the organoaluminum reducing compound in the reactor. Alternatively, the organoaluminum reducing agent and the alkylaluminum alkoxide can be combined and added to the vanadium compound in the reactor or the vanadium compound can be added to the other two components which have been combined in the reactor.

The alkoxide is particularly advantageous for use with a catalyst comprising vanadium oxytrichloride and a trialkylaluminum such as triethylaluminum. Such systems without the alkoxide present, are characterized by very poor chain transfer. With aluminum trialkyls such as triethylaluminum, which are strong reducing agents, at trialkylaluminum/VOCl$_3$ molar ratios of <2:1, these catalysts are active; however, as the mole ratio increases beyond 2:1, they become progressively inactive. With a small amount of alkoxide added to the system in the specified manner, mole ratios of trialkylaluminum/VOCl$_3$ of 3 and higher can be employed effectively. The added alkoxide results in a catalyst system with increased sensitivity to hydrogen, i.e., the ability of hydrogen to act as a chain-transfer agent in controlling molecular weight in the polymerization process is greatly enhanced in the presence of this catalytic system. With this system, lower molecular weight polymers can be produced at the same hydrogen concentration or lesser amounts of hydrogen are required to produce polymer products having specified molecular weights.

The invention is illustrated in the following examples which, however, are not to be construed as limiting it in any manner whatsoever. Unless otherwise stated all parts given are parts by weight.

EXAMPLE 1

A series of polymerizations of ethylene was conducted in a laboratory reactor to demonstrate the effect of adding an alkylaluminum alkoxide to a so-called Ziegler catalyst comprised of a vanadium compound, namely, vanadium oxytrichloride, and various alkylaluminum compounds when employing hydrogen as a molecular weight control agent.

To a catalyst preparation vessel maintained under an inert atmosphere were charged 25 ml. of n-pentane, and the required amounts of the catalyst ingredients, namely, (1) vanadium oxytrichloride dissolved in hexane, (2) an aluminum alkyl or alkylaluminum halide, and (3) a 50:50 mixture of diethylaluminum ethoxide (DEAE) and ethylaluminum diethoxide (EADE), referred to for convenience as ethylaluminum sesquiethoxide (EASE), to provide the molar proportions desired in the finished catalyst complex. After thorough mixing for about ten minutes, the contents of the vessel were transferred to a catalyst deposition vessel containing from 30 to 60 grams of polyethylene powder maintained in a fluidized state by means of a stream of inert gas at a temperature of about 50° C. The catalyst mixture was contacted with the polyethylene and became deposited thereon after which the solvent was evaporated and the catalyst dried on the substrate polymer.

The solid catalyst so prepared was charged to a batch-type cylindrical reactor which was surrounded by a water jacket for temperature control where it was maintained in a fluidized state by recycled reactant gas of ethylene monomer containing a predetermined amount of hydrogen. Ethylene monomer was fed to the bottom of the reactor to maintain the pressure in the system at approximately atmospheric. Hydrogen was admitted to the reactor at a rate to maintain the desired concentration at a constant level. The unreacted gas leaving the top of the reactor was passed through a disengaging zone for removal of any fine polymer particles. Product polyethylene was removed from the reactor through a product discharge valve near the bottom of the reactor. For comparative purposes, polymerizations were conducted with catalysts prepared in a similar fashion but without the ethoxide in the catalyst complex and with catalysts prepared as described above but with variation in the order in which the catalyst constituents were combined. Conditions for catalyst make-up and for the polymerization together with the properties of the product are presented in Table 1 below. Melt index ($I_2$) was determined by ASTM Test No. D-1238-65T using a 2160-gram weight. Melt extrusion rate ($I_{10}$) was determined using the same method employed for determination of melt index except that the weight on the sample was 10 kg. From the data presented, it can be readily seen that significantly better control of molecular weight is obtained with a given amount of hydrogen with the alkoxide-containing catalyst provided the alkoxide is not added after the vanadium compound and the alkylaluminum reducing agent are already reacted.

TABLE 1

| Run No. | Catalyst components (mmol/l.) of— | | | Component added last | $H_2$, percent | Temp., °C. | Polymer properties $I_2$ |
|---|---|---|---|---|---|---|---|
| | (1) V compound | (2) Organo aluminum compound | (3) Alkoxide | | | | |
| 1 | VOCl₃, 1 | EtAlBr₂,[a] 3.1 | None | | 25 | 70 | Too low to measure. |
| 2 | VOCl₃, 1 | None | EASE, 10 | | 25 | 73 | No polymer, catalyst inactive. |
| 3 | VOCl₃, 1 | EtAlBr₂, 3.1 | EASE, 3.1 | (1) | 25 | 70 | 0.30. |
| 4 | VOCl₃, 1 | Et₃Al,[b] 1 | EASE, 6 | (2) | 10 | 82 | 1.7. |
| 5 | VOCl₃, 1 | Et₃Al,[b] 3 | None | | 13 | 82 | 0.06. |
| 6 | VOCl₃, 1 | Et₃Al,[b] 3 | EASE, 6 | (2) | 12 | 82 | 0.95. |
| 7 | VOCl₃, 1 | Et₃Al,[b] 3 | EASE, 6 | (1) | 14 | 83 | 0.67. |
| 8 | VOCl₃, 1 | Et₃Al,[b] 3 | EASE, 10 | (2) | 12 | 82 | 1.4. |
| 9 | VOCl₃, 1 | Et₃Al,[b] 3 | EASE, 10 | (1) | 13 | 81 | 1.1. |
| 10 | VOCl₃, 1 | Et₃Al,[b] 6 | EASE, 6 | (2) | 10 | 68 | 1.0. |
| 11 | VOCl₃, 1 | Et₃Al,[b] 6 | None | | 10 | 79 | No polymer, catalyst inactive. |
| 12 | VOCl₃, 1 | IPA,[c] 6 | do | | 13 | 81 | 0.01. |
| 13 | VOCl₃, 1 | IPA,[c] 6 | EASE, 3 | (2) | 8 | 82 | 0.12. |
| 14 | VOCl₃, 1 | IPA,[c] 3 | EASE, 6 | (2) | 12 | 75 | 1.1. |
| 15 | VOCl₃, 1 | IPA,[c] 3 | EASE, 6 | (3) | 12 | 83 | 0.02. |
| 16 | VOCl₃, 1 | IPA,[c] 3 | EASE, 6 | (2) | 18 | 70 | 2.2. |
| 17 | VOCl₃, 1 | Et₃Al₂Br₃,[d] 3 | EASE, 6 | (2) | 14 | 74 | 1.7. |
| 18 | VOCl₃, 1 | Et₃Al₂Br₃,[d] 3 | EASE, 6 | (2) | 0 | 74 | Too low to measure. |

[a] Ethylaluminum dibromide.
[b] Triethylaluminum.
[c] Isoprenylaluminum (reaction product of diisobutylaluminum hydride and isoprene).
[d] Ethylaluminum sesquibromide

EXAMPLE 2

A second series of polymerization runs was conducted in the so-called slurry phase, i.e., the polymerization reaction was carried out in an inert organic liquid diluent. In these runs, the catalyst consisted of (1) vanadium oxytrichloride, (2) ethylaluminum dichloride and (3) ethylaluminum sesquiethoxide with various orders of addition of these components being used in the preparation of the catalysts. The catalyst compositions were prepared in approximately 90-ml. volume in a separate cylindrical vessel provided with stirrer means, referred to hereinafter as a complexer, containing hexane at ambient temperature. The required amount of vanadium oxytrichloride in hexane solution was charged from a syringe via a serum-capped injection port followed by the injection of either the alkoxide compound or the alkylaluminum compound as desired. This mixture was allowed to age for about three minutes after which the remaining component was added. After aging for another 3-minute period still at ambient temperature, the entire contents of the complexer were discharged into the polymerization reactor which contained approximately 1.5 liters of hexane under agitation at about 50° C. The complexer was rinsed with hexane at ambient temperature and this hexane was dumped into the reactor. Vanadium concentration in the reactor varied from abou 0.025 to 0.05 mmole per liter.

The polymerizations were conducted in a stirred, 2.5-liter, stainless-steel, jacketed reactor. The reactor was conditioned by cleaning, purging with hot nitrogen until dry and essentially oxygen-free and charging with hexane, the reaction medium. High purity ethylene was passed through activated carbon and molecular sieve columns to a blending system. Hydrogen was introduced into the ethylene from a cylinder, pressure-regulated to 100 p.s.i.g. after it had been deoxygenated and dried by passage through a BTS column and a molecular sieves column and this mixture was stored in a surge tank. After introduction of the catalyst complex into the reactor, the reactor was brought up to a pressure of about 100 p.s.i.g. with the ethylene/hydrogen mixture from the surge tank and the reactor was heated to about 90° C. by admitting steam to the jacket.

After reactor pressure was attained, the ethylene/hydrogen feed mixture from the surge tank was switched to direct addition of these two gases to the reactor via separate rotameters at rates to maintain reactor pressure. Hydrogen content in the feed and reactor off-gas was monitored and the hydrogen flow was adjusted to keep the concentration at the desired level throughout the reaction time of approximately one hour. Reactor temperature was controlled at about 90° C. by adjustment of the steam to the reactor jacket and by use of a cold water cooling coil in the reactor.

At the end of the polymerization reaction, the slurry from the reactor was discharged into a collection vessel. The finishing steps consisted of filtration, washing and stabilization, all accomplished in a large Büchner funnel. Methanol and hexane were used for washing the polymer and a solution of a phenolic anti-oxidant was employed for stabilization. The polymer was dried before determination of physical properties. Results are presented in Table 2 below from which it will be seen that the addition of the aluminum alkoxide results in an increase in melt index but that this effect is not a significant one unless the alkoxide is added prior to the reaction of the vanadium compound and the organoaluminum compound.

TABLE 2

| Catalyst components in order of addition and concentration (mmol/l.) | $H_2$, percent | Polymer properties of— | |
|---|---|---|---|
| | | $I_2$ | $I_{10}/I_2$ |
| EtAlCl$_2$, 0.25; VOCl$_3$ b 0.025 | 42 | 0.16 | 13 |
| EtAlCl$_2$, 0.25; EASE,c 0.5; VOCl$_3$, 0.025 | 40 | 20.8 | 14.4 |
| EtAlCl$_2$, 0.4; VOCl$_3$, 0.13; EASE, 0.5 | 40 | 1.0 | 21.6 |
| EtAlCl$_2$, 0.4; EASE, 0.5; VOCl$_3$, 0.13 | 40 | 12 | 15.5 |
| EASE, 0.5; VOCl$_3$, 0.12; EtAlCl$_2$, 0.4 | 41 | 51 | (1) |
| EASE, 0.5; VOCl$_3$, 0.05 | (2) | (2) | (2) |

1 Not determined.
2 No reaction.
a EtAlCl$_2$=Ethylaluminum dichloride.
b VOCl$_3$=Vanadium oxytrichloride.
c EASE=Ethylaluminum sesquiethoxide.

EXAMPLE 3

Another series of experiments were conducted in a jacketed Pyrex reactor of about one-liter capacity equipped with a stirrer. The reactor wall had four vertical creases to serve as baffles to improve agitation. The top of the reactor was of stainless steel and was fitted with sufficient openings to allow connection of all liquid, gas, vent and vacuum lines needed for operation. An internal thermocouple also reached through the top. The glass reactor body was sealed to the reactor top by an O-ring and a standard glass pipe flange. The reactor temperature was controlled by circulating liquid from a constant temperature bath through the jacket.

Prior to operation, the reactor was purged with nitrogen until the vent gas contained 2 p.p.m. oxygen or less and then rinsed with a solution of either triethyl or trimethylaluminum to scavenge any poisons which might be present. Approximately 300 ml. of a hydrocarbon solvent known to the trade as "Isopar E" which had been purified and purged free of oxygen was charged to the reactor. Ethylene and hydrogen were then introduced into the reactor to provide final solution concentrations of 52–53 mmols/l. of ethylene and 1.5 mmols/l. of hydrogen while the reaction temperature therein was maintained at about 19.5–21.0° C. Measured amounts of stock solutions of the catalyst components were injected in the desired sequence into the reactor via syringe through a double septum inlet. The polymerization was conducted until the desired amount of polyethylene was made. The reaction was then terminated by quenching with 5 to 20 ml. of an alcohol such as methanol or n-butanol, isobutanol or isopropanol. The polymer was recovered from the reaction slurry by detaching the reactor from the top and pouring the slurry at room temperature (sometimes with excess alcohol) onto a suction filter. In some runs, the polymer was vacuum dried at 80° C. with no further treatment. In others, catalyst residues were removed by treatment with hot isopropanol containing HCl. Weight-average molecular weight ($\overline{M}_w$) determinations were made on the polymer products by gel permeation chromatography which is described in detail in two literature articles by Jack Cazes, XXIX. Gel Permeation Chromatography—Part One, J. Chemical Education, 43, No. 7, July 1966, A567; and XXIX. Gel Permeation Chromatography—Part Two, J. Chemical Education, 43, No. 8, August 1966, A625. The $\overline{M}_w$ values are related to melt index by an equation of the form $\overline{M}_w = A + B \log I_2$ where A and B are constants. Therefore, as $\overline{M}_w$ increases, the melt index decreases. Catalyst components, reaction conditions and data obtained on the polymer products are summarized in Table 3 below. For comparative purposes, Runs 1 and 2 were made with no hydrogen being introduced into the system.

It will be seen from the data presented that the addition of an alkoxide to a catalyst system comprised of a vanadium compound and an organoaluminum compound used in polymerizing ethylene in the presence of hydrogen results in a decrease in molecular weight or an increase in melt index value of the polymer made with the system and that the magnitude of the effect is dependent upon the order of addition of the components of the catalyst system, no significant effect being obtained unless the alkoxide is added before the main catalyst components are allowed to react. The first two runs clearly show that the effect does not occur in the absence of hydrogen. Runs 3 and 5 show that no $\overline{M}_w$ lowering occurs if the alkoxide is added last. Run 4 represents the preferred method of alkoxide addition with the $\overline{M}_w$ value being lowered over that of Runs 3 and 5. Similar effects are seen in the other runs from which it may also be observed that $\overline{M}_w$ is generally lowered further with higher concentrations of the alkoxide.

TABLE 3

| Run No. | Catalyst components (mmol/l.) of— | | | Component added last | $\overline{M}_w$ |
|---|---|---|---|---|---|
| | (1) VOCl$_3$ | (2) Organo aluminum | (3) EASE | | |
| 1 | 0.13 | IPA, 0.80 | 0 | — | 1,416,000 |
| 2 | 0.13 | IPA, 0.80 | 0.80 | (2) | 1,392,000 |
| 3 | 0.13 | IPA, 0.80 | 0 | — | 272,000 |
| 4 | 0.13 | IPA, 0.80 | 0.80 | (2) | 143,000 |
| 5 | 0.13 | IPA, 0.80 | 0.80 | (3) | 345,000 |
| 6 | 0.03 | Et$_3$Al, 0.10 | 0 | — | 269,000 |
| 7 | 0.03 | Et$_3$Al, 0.10 | 0.03 | (3) | 283,000 |
| 8 | 0.03 | Et$_3$Al, 0.10 | 0.03 | (3) | 295,000 |
| 9 | 0.03 | Et$_3$Al, 0.10 | 0.03 | (2) | 206,000 |
| 10 | 0.03 | Et$_3$Al, 0.10 | 0.07 | (2) | 242,000 |
| 11 | 0.07 | Et$_3$Al, 0.20 | 0.13 | (2) | 176,000 |
| 12 | 0.03 | Et$_2$AlCl, 0.17 | 0 | — | 291,000 |
| 13 | 0.03 | Et$_2$AlCl, 0.17 | 0.33 | (1) | 208,000 |
| 14 | 0.03 | Et$_2$AlCl, 0.10 | 0.03 | (2) | 228,000 |
| 15 | 0.03 | Et$_2$AlCl, 0.10 | 0.07 | (2) | 168,000 |

NOTE.—IPA=Isoprenyl aluminum; Et$_3$Al=Triethylaluminum; Et$_2$AlCl=Diethylaluminum chloride.

EXAMPLE 4

Following the procedure described in Example 3, a series of polymerizations of ethylene was conducted using the same conditions but substituting vanadium tetrachloride (VCl$_4$) for the vanadium oxytrichloride (VOCl$_3$) in that example. Results presented in Table 4 show that inclusion of an alkylaluminum alkoxide in a complex of VCl$_4$ or a 4:1 mixture of VCl$_4$/VOCl$_3$ and an organoaluminum alkylating agent gives the same general polymer $\overline{M}_w$ level as when VOCl$_3$ alone is the vanadium-containing component of the catalyst complex.

TABLE 4

| Run No. | Catalyst components (mmol/l.) of— | | | Component added last | $M_w$ |
|---|---|---|---|---|---|
| | (1) VCl₄ | (2) Organo aluminum | (3) EASE | | |
| 1 | 0.53 | Et₃Al, 0.60 | 0.12 | (2) | 252,000 |
| 2 | 0.58 | Me₃Al, 0.73 | 0.57 | (1) | 172,000 |
| 3 | ¹ 0.16 | Et₃Al, 0.30 | 1.20 | (2) | 238,000 |
| 4 | ¹ 0.16 | Et₂AlCl, 0.30 | 1.20 | (2) | 185,000 |

¹ Plus 0.04 VOCl₃.

NOTE.—Et₃Al=Triethylaluminum; Me₃Al=Trimethylaluminum; Et₂AlCl=Diethylaluminum chloride.

EXAMPLE 5

Following the procedure described in Example 3, a series of ethylene polymerization was conducted at 20.0–22.5° C. with solution concentrations of ethylene of 51–53 mmoles/l. and VOCl₃ of 0.48 mmole/l. These runs were to establish the effect of varying $n$ in the aluminum alkoxide formula $Et_nAl(OEt)_{3-n}$ where Et represents the ethyl radical. The data are given in Table 5. Clearly, ethylaluminum diethoxide is more effective than diethylaluminum ethoxide. The comparison with the sesquiethoxide is not so clear, but it also appears to be more effective than the monoethoxide.

TABLE 5

| Run No. | IPA,¹ mmole/l. | H₂ mmole/l. | $Et_nAl(OEt)_{3-n}$ | | $M_w$ |
|---|---|---|---|---|---|
| | | | n | Mmole/l. | |
| 1 | 2.74 | 0.75 | 2 | 0.50 | 333,000 |
| 2 | 2.74 | 0.75 | 1 | 0.50 | 270,000 |
| 3 | 2.74 | 2.0 | 2 | 0.70 | 410,000 |
| 4 | 3.56 | 2.0 | 1.5 | 0.60 | 154,000 |
| 5 | 2.74 | 2.0 | 1 | 0.70 | 179,000 |

¹ Isoprenylaluminum added after VOCl₃ and the aluminum alkoxide were mixed.

EXAMPLE 6

Polymerization of ethylene and the copolymerization of ethylene and propylene in the vapor phase were carried out in a bench-scale unit comprising a polymerization reactor, a heat exchanger and the necessary accessory equipment. The jacketed reactor was generally of cylindrical configuration and of such size as to contain a fluidized bed of catalyst particles approximately 4″ in diameter and 3′ in depth. At the top of the catalyst bed section, the reactor expanded in the form of an inverted cone into a disengaging section of larger diameter where any entrained particles in the unreacted gas were separated and fell back into the bed. Recycle gas was continuously introduced at the bottom of the reactor at a rate sufficient to maintain the particles in the bed in a highly agitated state so as to create a dense phase therein. Make-up ethylene and hydrogen were introduced into the recycle gas line while fresh catalyst particles were fed into the reactor from the top. The polymer product was withdrawn from the bottom of the reactor. Unreacted gas, i.e., recycle gas, from the top of the disengaging zone was led through a heat exchanger to maintain a predetermined temperature before being returned to the reactor.

The catalyst was prepared in the manner described in Example 1 by feeding to the catalyst preparation vessel the required amounts of n-hexane and of hexane solutions of vanadium oxytrichloride the aluminum alkoxide and the organoaluminum reducing agent, mixing these ingredients thoroughly and thereafter depositing this mixture in a separate vessel on polyethylene powder, the polyethylene being of the same type as that being produced.

The catalyst was charged continuously to the reactor maintained at a pressure of 500 p.s.i. while ethylene was fed continuously into the fluidized bed at a rate of 1.2 p.p.h. and product was continuously withdrawn at a rate of 1.0 p.p.h. as described above.

The various catalyst compositions and polymerization conditions employed together with the properties of the polymer products are presented in Table 6. The data show that the addition of various alkoxides as described in the present invention provides for the production of both homopolymers and copolymers of ethylene with only small amounts of hydrogen being required for molecular weight control.

The catalyst complex to which the modifier or co-catalyst of the present invention, however it may be termed, is added is a so-called Ziegler catalyst as described above, that is, the complex product formed from the reaction of a transition metal compound, which in this instance is a compound of vanadium, with a metallic reducing agent, which here is an organoaluminum compound. The halides of vanadium are the preferred compounds; however, alkoxides, organic salts or complexes of this metal can also be used. The vanadium in the compounds employed should be in a valence form higher than the lowest possible valence and preferably should be in a valence state of 3 and above. The tetrahalides, trihalides, and mixtures of the di-, tri- and tetrahalides, etc., can be used. Especially preferred is vanadium oxytrichloride. Vanadium compounds other than the halides which can be employed include vanadium triacetylacetonate, vanadium oxydiacetylacetonate, vanadium naphthenate, vanadium benzoate, or vanadium esters such as $VO(OC_4H_9\text{-}i)_3$, $VO(OC_3H_7\text{-}i)_3$, $VO(OC_2H_5)Cl_2$, $VO(OC_2H_5)_2Cl$ and the like.

TABLE 6

| Run No. | Catalyst components in order of addition (mmol/l.) of— | | | H₂, percent | Temp., ° C. | C₃H₆, percent | Polymer properties of— | | |
|---|---|---|---|---|---|---|---|---|---|
| | (1) V compound | (2) Alkoxide | (3) Organo aluminum compound | | | | I₂ | I₁₀ | Density, g./cc. |
| 1 | VOCl₃, 5 | EASE, 30 | Et₃Al, 15 | 4–6 | 85 | | 0.32 | 3.8 | 0.964 |
| 2 | VOCl₃, 5 | EASE, 30 | Et₃Al, 15 | 8–9 | 110 | | 19.8 | | 0.968 |
| 3 | VOCl₃, 5 | EASE, 30 | Et₃Al, 15 | 10–12 | 85 | | 6.0 | | |
| 4 | VOCl₃, 5 | EASE, 30 | Et₃Al, 15 | 13–15 | 85 | | 12.1 | | |
| 5 | VOCl₃, 5 | EASE, 30 | Et₃Al, 15 | 2.2–2.4 | 85 | 7 | 0.24 | 3.3 | 0.940 |
| 6 | VOCl₃, 5 | EASE, 30 | Et₃Al, 15 | 3.2–3.4 | 85 | 2.2–2.7 | 0.28 | 3.7 | 0.950 |
| 7 | VOCl₃, 5 | EADE³, 30 | Et₃Al¹ ² | 3.4 | 90 | | 0.30 | 3.3 | |
| 8 | VOCl₃, 5 | EADIP⁴, 30 | Et₃Al¹ ² | 3.6 | 90 | | 0.33 | 3.6 | |
| 9 | VOCl₃, 5 | DEAE⁶, 30 | IPA¹ ⁵ | 9–10 | 105 | | 19.6 | | |
| 10 | VOCl₃, 1 | EADIP, 30 | Et₃Al¹ ⁷ | 4 | 90 | | 0.43 | 5.2 | |
| 11 | VOCl₃, 1 | EADIP, 6 | Et₃Al¹ ⁷ | 4.2 | 90 | | 0.40 | 5.0 | |

¹ The VOCl₃-alkoxide was supported on substrate and activated in the polymerization reactor with the designated triethyl aluminum (Et₃Al) or isoprenylaluminum (IPA).
² Average mole ratio of Et₃Al/VOCl₃=100.
³ EADE=Ethylaluminum diethoxide.
⁴ EADIP=Ethylaluminum diisopropoxide.
⁵ Average mole ratio of IPA/VOCl₃=12.
⁶ DEAE=Diethylaluminum ethoxide.
⁷ Average mole ratio of Et₃Al/VOCl₃=500.

As previously indicated, the organoaluminum compound may be any compound of the formula $R_nAlX_{3-n}$ where R is a saturated acyclic hydrocarbon radical, a saturated cyclic hydrocarbon radical or an aromatic radical having 1 to 10 carbon atoms, X is a halogen and $n$ is 1, 2 or 3, and mixtures thereof. The organoaluminum compounds preferred as metallic reducing agents are compounds such as triethylaluminum, tributylaluminum, triisobutylaluminum, tripropylaluminum, triphenylaluminum, trioctylaluminum, tridodecylaluminum, dimethylaluminum chloride, diethylaluminum chloride, dipropylaluminum fluoride, dissobutylaluminum chloride, ethylaluminum dichloride, isoprenyl aluminum and the like. Mixtures of the foregoing types of aluminum compounds can also be employed. The total reaction mixtures obtained in the formation of such compounds, i.e., by treatment of metallic aluminum with alkyl halides resulting in the formation of such mixtures as dialkylaluminum halides plus monoalkylaluminum dihalides, termed alkylaluminum sesquihalides, are also suitable. Especially preferred in the process of the present invention is the complex product formed by the reaction of vanadium oxytrichloride with a trialkyl aluminum compound such as triethylaluminum.

The aluminum alkoxide added to the catalyst complex employed for polymerization in accord with the process of this invention may be any compound of the formula $R_nAl(OR)_{3-n}$ wherein R is a hydrocarbyl group containing from about 1 to about 12 carbon atoms and $n$ varies from 0.5 to 2.0 and preferably from 1 to 1.5 inclusive. The hydrocarbyl group can be any selected hydrocarbon group such as alkyl, aralkyl, aryl, alkaryl, alicyclic, bicyclic, and the hydrocarbons. Suitable examples include methyl, ethyl, propyl, isopropyl, n-butyl, isobutyl, n-pentyl, isopentyl, t-pentyl, hexyl, cyclohexyl, 2-methylpentyl, heptyl, octyle, 2-ethylhexyl, cyclohexylmethyl, nonyl, decyl, dodecyl, benzyl, pinyl, pinylmethyl, phenethyl, p-methylbenzyl, phenyl, tolyl, xylyl, naphthyl, ethylphenyl, methylnaphthyl, or any such similar hydrocarbon groups. Preferably, those R groups directly bonded to the aluminum atom are alkyl groups containing from 1 to 8 carbon atoms and they can be the same or different. Particularly preferred compounds are ethylaluminum diethoxide, diethylaluminum ethodixe and ethylaluminum diisopropoxide.

The desired alkoxides employed in the process of this invention are readily obtained by a direct reaction between the hydrocarbon alcohol or phenol corresponding to the desired oxyhydrocarbyl groups and a hydrocarbyl aluminum compound corresponding to the hydrocarbyl groups desired in the composition. For example, the interaction of triethylaluminum with two moles of ethyl alcohol yields ethylaluminum diethoxide while the reaction of diisobutylaluminum hydride with one mole of isobutanol produces another useful compound, diisobutylaluminum isobutoxide. The reaction occurs upon simple admixture of the stoichiometric amount of the alcohol and the organoaluminum compound with no catalyst or heating being required. Different alcohols may be used to give mixed alkoxides. For example, triethylaluminum treated with one mole of methanol followed by one mole of tert-butanol gives tert-butoxymethoxyethylaluminum.

Another suitable method for preparing alkylaluminum alkoxides is the reaction of aluminum alkyls with aluminum alkoxides, for example:

(1) $2AlR_3 + Al(OR)_3 \rightarrow 3R_2AlOR$, (2) $AlR_3 + 2Al(OR)_3 \rightarrow 3RA(OR)_2$ and (3) $AlR_3 + Al(OR)_3 \rightarrow R_2AlOR + RAl(OR)_2$.

Reactions 1 and 2 were described by A. V. Grosse and J. M. Mavity, J. Org. Chem., 5, 106 (1940).

A third suitable method for preparing alkylaluminum alkoxides is the reaction of oxygen with aluminum alkyls, for example: $2R_3Al + O_2 \rightarrow 2R_2AlOR$ and $$R_3Al + O_2 \rightarrow 2RAl(OEt)_2.$$

G. A. Razuvaev et al. Dokl. Akad. Nauk., SSSR, 152(1), 114–16 (1963); C.A., 59, 15133a (1963).

The quantities of the components of the catalytic system of the invention can be varied. In general the mole ratio of reducing agent to transition metal compound can be in the range from 0.3:1 to 500:1, on up to 1000:1 or even higher. The preferred Al:V ratio of organoaluminum compound to vanadium compound lies between 1:1 and 500:1. The alkoxide-to-vanadium ratio may likewise vary from about 1:10 to about 100:1. For most effective operation, ratios from about 1:2 to about 50:1 are employed.

In the so-called slurry process, the catalyst is suspended for the polymerization reaction in an inert reaction medium or diluent sometimes referred to as a liquid-slurry medium. Preferably, the diluent should be low-boiling so that trace amounts left on the polymers can be removed conventionally in a drying step. Suitable for use as inert liquid media or diluents are saturated aliphatic and alicyclic hydrocarbons, aromatic hydrocarbons and halogenated hydrocarbons. Of these the hydrocarbon solvents such as pentane n-hexane, n-heptane, n-octane and the various isomeric hexanes, heptanes and octanes, cyclohexanes, methyl cyclopentane, dodecane and industrial solvents composed of saturated and/or aromatic hydrocarbons such as kerosene, naphtha and the like are most generally used, with the saturated aliphatic hydrocarbons having from about 5 to about 12 carbon atoms being preferred and especially preferred is n-hexane. However, benzene, toluene, ethylbenzene, cumene, Decalin, ethylene dichloride, tetrachloroethane, chlorobenzene, orthodichlorobenzene, and the like can be used. The quantity of liquid reaction medium or diluent is subject to substantial variation. The amount may be kept low in the reaction medium such as from 0.1 to 0.5 part by weight of diluent per part by weight of total polymer used. However, it is often helpful in obtaining contact between monomer and catalyst and in aiding removal of heat of reaction to employ larger amounts of the inert liquid suspending medium or diluent, for example, from about 4 to about 30 parts by weight of the liquid medium or diluent per part by weight of total polymer.

The catalyst system of the invention is equally as useful in the gas phase polymerization of olefins as in the slurry or liquid process. For conducting the polymerization in the gas phase using a fluidized-solids technique, the catalyst is prepared by depositing the active ingredients on a suitable substrate or support by preparing the catalyst as a solution or slurry admixing it thoroughly with the substrate while the latter is maintained in a fluidized state in suitable equipment by means of warm inert gas. The solvent is evaporated and the catalyst dried on the substrate in the fluid bed. Deposition can be effected either at atmospheric pressure or at elevated pressures. Generally, the preferred substrate is finely divided or granular polymer, preferably consisting of the same type of polymer as produced in the process, namely, polyethylene, to provide the desirable large surface area required for contact of the catalyst with the monomer. The polyethylene particles, if desired, can be mixed with other inert materials or other supports can be employed. Any inert, anhydrous materials suitable for the adsorption and/or deposition of the catalyst constituents thereon can be used as catalyst supports provided these remain unaltered under the catalyst preparation conditions and during the polymerization process and they do not soften and/or agglomerate under such conditions. Suitable materials include, for example, anhydrous silica, alumina, silica-alumina mixtures, calcium carbonate, calcium chloride, sodium chloride, charcoal, carbon black and the like. Such supports in general should have a surface area of the order of 0.1 to 800 m.² or more per gram and, preferably, have surface areas in the range of 0.5 to 500 m.² per gram. Particle size and surface area of the support or substrate are not critical.

The invention is broadly applicable to the preparation of all Ziegler-type solid polymers, i.e., all solid polymers prepared by polymerizing a monomer or mixture of monomers in the presence of a Ziegler-type catalyst. It is particularly suited for use with polymers prepared by polymerizing ethylenically unsaturated hydrocarbons or olefins such as ethylene as illustrated in the examples, propylene, butene-1, heptene-1, octadecene-1, dodecene-1, 3-methylbutene, 4-methylbutene-1, styrene, vinyl cyclohexene and the like either alone, with each other, or with other monomers especially diolefins such as butadiene, isoprene, piperylene, cyclopentadiene, 1,4-pentadiene and the like.

The amount of catalyst required is comparatively small. Generally, amounts from 0.01 to 50% by weight based to the total weight of monomer charged are satisfactory although amounts as small as 0.001% are sometimes permissible and larger amounts up to, say 20% can be employed.

The polymerization reaction can be conducted over a wide range of temperatures from 0 to 120° C. and higher if desired. Preferably, reaction temperature is maintained at about 65° to 115° C. Likewise, while atmospheric and subatmospheric pressures can be used superatmospheric pressures are preferred. The applicability of the present process is not limited to any catalyst suspending medium or particular conditions of temperature and pressure under which the polymerization reaction itself is carried out.

Generally, when the vanadium-containing catalysts of the present invention are employed for polymerizing olefins, only small amounts of catalyst are required and catalyst residues in the polymer are at such a low level as to be insignificant and non-interfering in subsequent processing of the polymer. Quenching is not usually required when the polymerization is conducted in the gas phase. However, in some instances when the slurry-phase technique is used, it may be necessary or desirable to inactivate the catalyst and remove the catalyst residues from the polymer. Any alkyl alcohol containing from 1 to 8 carbon atoms can be employed for quenching or destruction of the catalyst after the polymerization is complete and before separation of the polymer from the reaction mixture. Of the suitable alcohols which include methyl alcohol, ethyl alcohol, propyl alcohol, isobutyl alcohol, amyl alcohol, hexyl alcohol, octyl alcohol, and the like, isopropyl and tert-butyl alcohols are the preferred quenching agents. The amount of alcohol used for quenching is critical only in the sense that it must be sufficient to destroy completey all catalyst activity and may be varied widely from about 0.001% to about 300% of the weight of the reaction mixture or polyolefin slurry being treated. The optimum amount for use will vary according to the quantity of catalyst present in the polymerizate. Generally, amounts from those about equivalent to the total number of aluminum-carbon bonds in the catalyst components up to about 25% by weight of the polymer slurry are satisfactory, but the amount can be controlled as desired to provide enough of alcohol to form a slurry of satisfactory fluidity while remaining within the bounds of economical operations. The quenching operation and recovery of the polymer may be carried out according to well-known conventional procedures.

What is claimed is:

1. A catalyst composition for the polymerization and copolymerization of ethylene in the presence of hydrogen as a molecular weight control agent consisting essentially of (1) a compound of vanadium, (2) a trialkyl aluminum and (3) an alkylaluminum alkoxide of the formula $R_nAl(OR)_{3-n}$ wherein R is a hydrocarbyl group containing from about 1 to about 12 carbon atoms and $n$ varies from 0.5 to 2.0 inclusive and mixtures of such compounds, said catalyst composition being prepared by combining said vanadium compound with said aluminum alkoxide and thereafter combining the resulting mixture with said trialkyl aluminum, the molar ratio of said trialkyl aluminum to said compound of vanadium being within the range from 0.3:1 to 1000:1 and said alkoxide-to-vanadium ratio being in the range from 1:10 to about 100:1.

2. The catalyst composition of claim 1 wherein said vanadium compound is chosen from the group consisting of vanadium oxytrichloride, vanadium tetrachloride and mixtures thereof.

3. The catalyst composition of claim 2 wherein said vanadium compound is vanadium oxytrichloride.

4. The catalyst composition of claim 3 wherein said aluminum alkoxide is a mixture of diethylaluminum ethoxide and ethylaluminum diethoxide.

5. The catalyst composition of claim 3 wherein said aluminum alkoxide is ethylaluminum diethoxide.

6. The catalyst composition of claim 3 wherein said aluminum alkoxide is diethylaluminum ethoxide.

7. The catalyst composition of claim 3 wherein said aluminum alkoxide is ethylaluminum diisopropoxide.

8. The catalyst composition of claim 5 wherein said trialkylaluminum is triethylaluminum.

9. The catalyst composition of claim 6 wherein said trialkylaluminum is triethylaluminum.

10. The catalyst composition of claim 7 wherein said trialkylaluminum is triethylaluminum.

11. A process for producing ethylene polymers which comprises contacting ethylene in the presence of hydrogen and under polymerization conditions with a catalytic amount of a catalyst complex prepared by combining vanadium oxytrichloride with ethylaluminum diisopropoxide and thereafter combining the resulting mixture with triethylaluminum.

References Cited

UNITED STATES PATENTS

| | | | |
|---|---|---|---|
| 3,180,837 | 4/1965 | Bruce et al. | 260—94.9 B |
| 3,288,768 | 11/1966 | Shiga et al. | 260—94.9 E |
| 2,898,328 | 8/1959 | Reed et al. | 260—94.9 B |
| 3,639,381 | 2/1972 | Craven | 260—94.9 D |
| 3,535,297 | 10/1970 | Carrick et al. | 260—94.9 DA |

FOREIGN PATENTS

| | | | |
|---|---|---|---|
| 1,533,866 | 6/1968 | France. | |
| 1,059,864 | 2/1967 | Great Britain | 260—94.9 B |

JOSEPH L. SCHOFER, Primary Examiner

E. J. SMITH, Assistant Examiner

U.S. Cl. X.R.

252—429 C; 260—85.3 R, 88.2 R, 93.5 S, 93.7, 94.9 E